United States Patent
Ferreira et al.

(10) Patent No.: US 11,347,414 B2
(45) Date of Patent: May 31, 2022

(54) USING TELEMETRY DATA FROM DIFFERENT STORAGE SYSTEMS TO PREDICT RESPONSE TIME

(71) Applicant: EMC IP HOLDING COMPANY LLC, Hopkinton, MA (US)

(72) Inventors: Paulo Ferreira, Rio de Janeiro (BR); Adriana Prado, Niterói (BR); Pablo Da Silva, Niterói (BR); Ron Arnan, Nes Ziona (IL); Hagay Dagan, Pardes Hanna (IL); Adnan Sahin, Needham, MA (US)

(73) Assignee: Dell Products L.P., Hopkinton, MA (US)

( * ) Notice: Subject to any disclaimer, the term of this patent is extended or adjusted under 35 U.S.C. 154(b) by 321 days.

(21) Appl. No.: 16/662,185

(22) Filed: Oct. 24, 2019

(65) Prior Publication Data
US 2021/0124510 A1     Apr. 29, 2021

(51) Int. Cl.
*G06F 3/06*     (2006.01)
*G06N 5/04*     (2006.01)
*G06N 20/00*    (2019.01)

(52) U.S. Cl.
CPC .......... *G06F 3/0632* (2013.01); *G06F 3/0604* (2013.01); *G06F 3/067* (2013.01);
(Continued)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 7,003,527 B1 *   2/2006  Lavallee ............. H04L 41/0803
                                              707/999.102
7,234,073 B1 *   6/2007  Roytman ............ G06F 11/2025
                                              714/E11.073
(Continued)

OTHER PUBLICATIONS

Shiri Gaber, Oshry Ben-Harush, and Amihai Savir. 2017. Predicting HDD failures from compound SMART attributes. In <i> Proceedings of the 10th ACM International Systems and Storage Conference</i> (<i>SYSTOR '17</i>). Association for Computing Machinery, New York, NY, USA, Article 31, 1. (Year: 2017).*

(Continued)

*Primary Examiner* — Daniel C. Chappell
(74) *Attorney, Agent, or Firm* — Anderson Gorecki LLP (57) ABSTRACT

Telemetry data gathered from active deployed SAN nodes is used to create a machine learning model that predicts storage system performance, e.g. in terms of response time. The telemetry data may be filtered to remove outlier values and less relevant information before creating the training dataset. Engineered features may be created that include types of data that are not present in the telemetry data. For example, data types from the telemetry data may be combined to create engineered features that are more relevant than the individual data types. The engineered features are included in the training dataset. The machine learning model may be used to test possible configurations for a planned SAN node based on expected workload and performance requirements. Outputted data may include satisfactory configurations for a planned storage system.

20 Claims, 5 Drawing Sheets

(52) U.S. Cl.
CPC .............. *G06F 3/0653* (2013.01); *G06N 5/04* (2013.01); *G06N 20/00* (2019.01)

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–82; G06N 3/00–126; G06N 5/00–048; G06N 7/00–08; G06N 10/00; G06N 20/00–20; G06N 99/00–007; G11B 20/00–24; G11B 33/00–1493; G11C 7/00–24; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3297; H01L 2225/00–1094; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS

| | | | | |
|---|---|---|---|---|
| 7,640,342 | B1* | 12/2009 | Aharoni | .............. G06F 11/3442 709/229 |
| 9,021,198 | B1* | 4/2015 | Vijayan | .................. G06F 3/064 711/112 |
| 2015/0207883 | A1* | 7/2015 | Vijayan | .................. G06F 3/067 709/216 |
| 2016/0127470 | A1* | 5/2016 | Vijayan | .................. G06F 3/067 709/216 |
| 2018/0115598 | A1* | 4/2018 | Shariat | ....................... G06F 9/46 |
| 2018/0285777 | A1* | 10/2018 | Li | ........................... G06N 5/045 |
| 2018/0330258 | A1* | 11/2018 | Harris | .................... G06N 5/022 |
| 2019/0121542 | A1* | 4/2019 | Brennan | ............... G06F 3/0688 |
| 2020/0372401 | A1* | 11/2020 | Mallick | ............... G06F 13/1668 |
| 2021/0021526 | A1* | 1/2021 | Bharadwaj | .......... H04L 67/1097 |
| 2021/0117808 | A1* | 4/2021 | Gottin | ...................... G06N 5/04 |
| 2021/0124510 | A1* | 4/2021 | Ferreira | ................. G06N 20/20 |
| 2021/0216351 | A1* | 7/2021 | Chaterji | ................ G06F 9/3891 |
| 2021/0241180 | A1* | 8/2021 | Vishwakarma | ....... G06F 3/0619 |
| 2021/0286517 | A1* | 9/2021 | Karr | ....................... G06F 3/0688 |
| 2021/0367855 | A1* | 11/2021 | Pampaiah | ........... H04L 41/0896 |

OTHER PUBLICATIONS

Using Smart Attributes To Estimate Drive Lifetime; Samsung; 2016; retrieved from https://image-us.samsung.com/SamsungUS/b2b/resource/2016/05/31/WHP-SSD-SSDSMARTATTRIBUTES-APR16J.pdf on Nov. 6, 2021 (Year: 2016).*

Shiri Gaber, Oshry Ben-Harush, and Amihai Savir. 2017. Predicting HDD failures from compound SMART attributes. In Proceedings of the 10th ACM International Systems and Storage Conference</ (SYSTOR '17). Association for Computing Machinery, New York, NY, USA, Article 31, 1. (Year: 2017).*

N. Nguyen, M. Maifi Hasan Khan and K. Wang, "Towards Automatic Tuning of Apache Spark Configuration," 2018 IEEE 11th International Conference on Cloud Computing (CLOUD), 2018, pp. 417-425, doi: 10.1109/CLOUD.2018.00059. (Year: 2018).*

J. L. Greathouse and G. H. Loh, "Machine Learning for Performance and Power Modeling of Heterogeneous Systems," 2018 IEEE/ACM International Conference on Computer-Aided Design (ICCAD), 2018, pp. 1-6, doi: 10.1145/3240765.3243484. (Year: 2018).*

* cited by examiner

USING TELEMETRY DATA FROM DIFFERENT STORAGE SYSTEMS TO PREDICT RESPONSE TIME

TECHNICAL FIELD

The subject matter of this disclosure is generally related to data storage, and more particularly to SANs (storage area networks).

BACKGROUND

Data centers are used to maintain large data sets associated with critical functions for which avoidance of data loss and maintenance of data availability are important. A key building block of a data center is the SAN. SANs provide host servers with block-level access to data that is used by applications that run on the host servers. One type of SAN node is a storage array. A storage array may include a network of compute nodes that manage access to arrays of solid-state drives and disk drives. The storage array creates a logical storage device known as a production volume on which host application data is stored. The production volume has contiguous LBAs (logical block addresses). The host servers send block-level IO (input-output) commands to the storage array to access the production volume. The production volume is a logical construct, so the host application data is maintained at non-contiguous locations on the arrays of managed drives to which the production volume is mapped by the compute nodes. SANs have advantages over other types of storage systems in terms of potential storage capacity and scalability.

It can be difficult to determine a SAN node configuration for a specific implementation. Expected performance may be specified by a SLA (service level agreement). In general, SAN performance is a function of SAN workload and SAN configuration. Workload may be a function of host application type, activity level, traffic patterns, and the total numbers of host servers and instantiated instances of each host application, among other things that may change over time. Configurations may include a wide variety of amounts and types of storage and computing resources. Often, the SLA and expected workload of a planned SAN node will not match an existing SAN node so selecting a SAN configuration to efficiently satisfy an SLA can be difficult.

SUMMARY

All examples, aspects and features mentioned in this document can be combined in any technically possible way.

A method in accordance with some implementations comprises: gathering telemetry data from a plurality of active deployed SAN (storage array network) nodes; generating a machine learning model from the telemetry data; and using the model to compute at least one satisfactory configuration for a planned SAN node. Some implementations comprise filtering irrelevant telemetry data before generating the model from the telemetry data. Some implementations comprise filtering telemetry data outlier values before generating the model from the telemetry data. Some implementations comprise generating at least one engineered data type that is absent from the telemetry data, the engineered data type being included in a training dataset for generating the model from the telemetry data. In some implementations using the model to compute at least one satisfactory configuration for the planned SAN node comprises computing performance for each of a plurality of possible configurations for a planned workload. In some implementations using the model to compute at least one satisfactory configuration for the planned SAN node comprises computing response time for each of a plurality of possible configurations for a planned workload. Some implementations comprise determining whether the computed performance satisfies performance requirements. Some implementations comprise outputting configurations that satisfy the performance requirements. Some implementations comprise selecting one of the outputted configurations for the planned SAN node. Some implementations comprise generating a training dataset, a validation dataset, and a test dataset from the telemetry data.

An apparatus in accordance with some implementations comprises: a modeling node comprising software stored in non-transitory memory and run by a processor, the software comprising: instructions that gather telemetry data from a plurality of active deployed SAN (storage array network) nodes; instructions that generate a machine learning model from the telemetry data; and instructions that use the model to compute at least one satisfactory configuration for a planned SAN node. Some implementations comprise filtering instructions that remove from consideration telemetry data based on relevance before generating the model from the telemetry data. Some implementations comprise filtering instructions that remove from consideration telemetry data outlier values before generating the model from the telemetry data. Some implementations comprise feature engineering instructions that generate at least one engineered data type that is absent from the telemetry data, the engineered data type being included in a training dataset for generating the model from the telemetry data. In some implementations the instructions that use the model to compute at least one satisfactory configuration for the planned SAN node comprise instructions that compute performance for each of a plurality of possible configurations for the planned workload. In some implementations the instructions that use the model to compute at least one satisfactory configuration for the planned SAN node comprise instructions that compute response time for each of a plurality of possible configurations for the planned workload. Some implementations comprise instructions that determine whether the computed performance satisfies performance requirements. Some implementations comprise instructions that output configurations that satisfy the performance requirements. Some implementations comprise instructions that select one of the outputted configurations for the planned SAN node. Some implementations comprise instructions that generate a training dataset, a validation dataset, and a test dataset from the telemetry data.

Other aspects, features, and implementations may become apparent in view of the detailed description and figures.

DETAILED DESCRIPTION

Aspects of the inventive concepts will be described as being implemented in a data storage system that includes a host server and storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computing devices could operate simultaneously on one physical computing device. The term "logic" is used to refer to special purpose physical circuit elements, firmware, software, computer instructions that are stored on a non-transitory computer-readable medium and implemented by multi-purpose tangible processors, and any combinations thereof.

Figure 1:
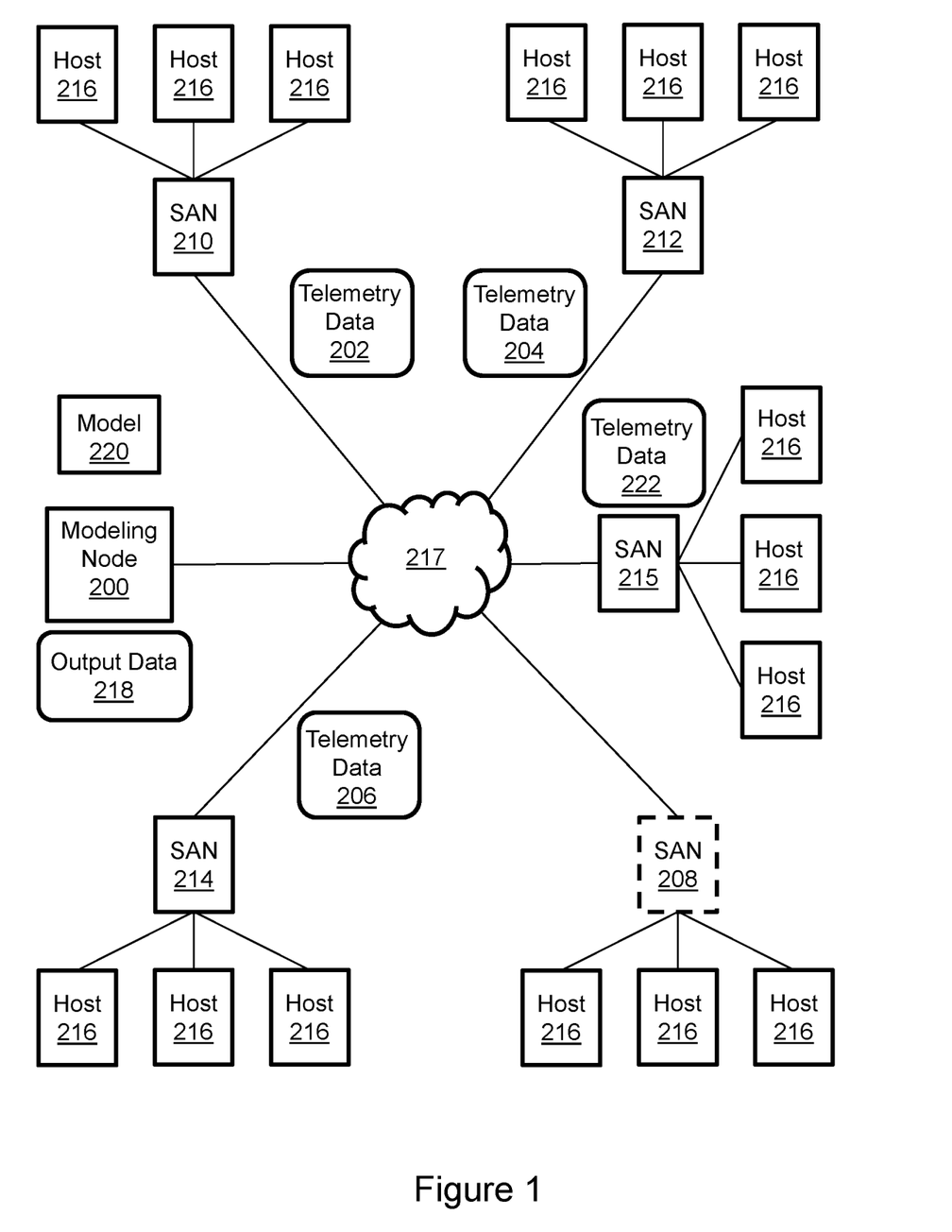
FIG. 1 illustrates a modeling node that uses telemetry data from different SAN nodes to predict response times for computing satisfactory configurations of a planned SAN node.

FIG. 1 illustrates a modeling node 200 that uses telemetry data 202, 204, 206, 222 from different SAN nodes 210, 212, 214, 215 to predict response times for computing satisfactory configurations of a planned SAN node 208. SAN nodes 210, 212, 214, 215 represent any number of active deployed SAN nodes from which telemetry data is gathered to generate a model 220. All nodes are accessible via a network 217. The active deployed SAN nodes 210, 212, 214, 215 each support some number of hosts 216, which are typically servers that instantiate multiple instances of host applications. SAN nodes are generally unaware of which types of host applications are instantiated. Moreover, as block-based storage nodes, SAN nodes are unaware of host application data structures such as files and database elements.

SAN nodes 210, 212, 214, 215 provide telemetry data to the modeling node 200. More specifically, telemetry data 202 is provided by SAN node 210, telemetry data 204 is provided by SAN node 212, telemetry data 206 is provided by SAN node 214, and telemetry data 222 is provided by SAN node 215. The telemetry data is different for each SAN node and may include per-SAN configuration data such as one or more of number of cores, number of engines, number of ports, number of storage groups, number of data pools, number of drives, capacity of drives, and types of drives. The telemetry data also includes per-SAN workload and performance information such as one or more of IOS (input-output operations per second), average response time, number of reads, number of writes, number of read hits, number of read misses, number of write hits, number of write misses, average size of reads (e.g., in MBs), and average size of writes (e.g., in MBs).

The modeling node uses the telemetry data to generate a learning, validation, and test datasets from which the SAN model 220 is created. The SAN model is used to generate output data 218, which includes one or more configurations that satisfy performance requirements for a planned workload. In general, SAN performance is a function of SAN workload and SAN configuration. Consequently, performance of the planned SAN can be predicted based on expected workload and possible configurations. The output data 218 may include configurations that satisfy performance requirements for an expected workload. Consequently, the output data 218 can be used to determine an efficient configuration for the planned SAN node that will satisfy performance guarantees with an acceptable margin of error.

Figure 2:
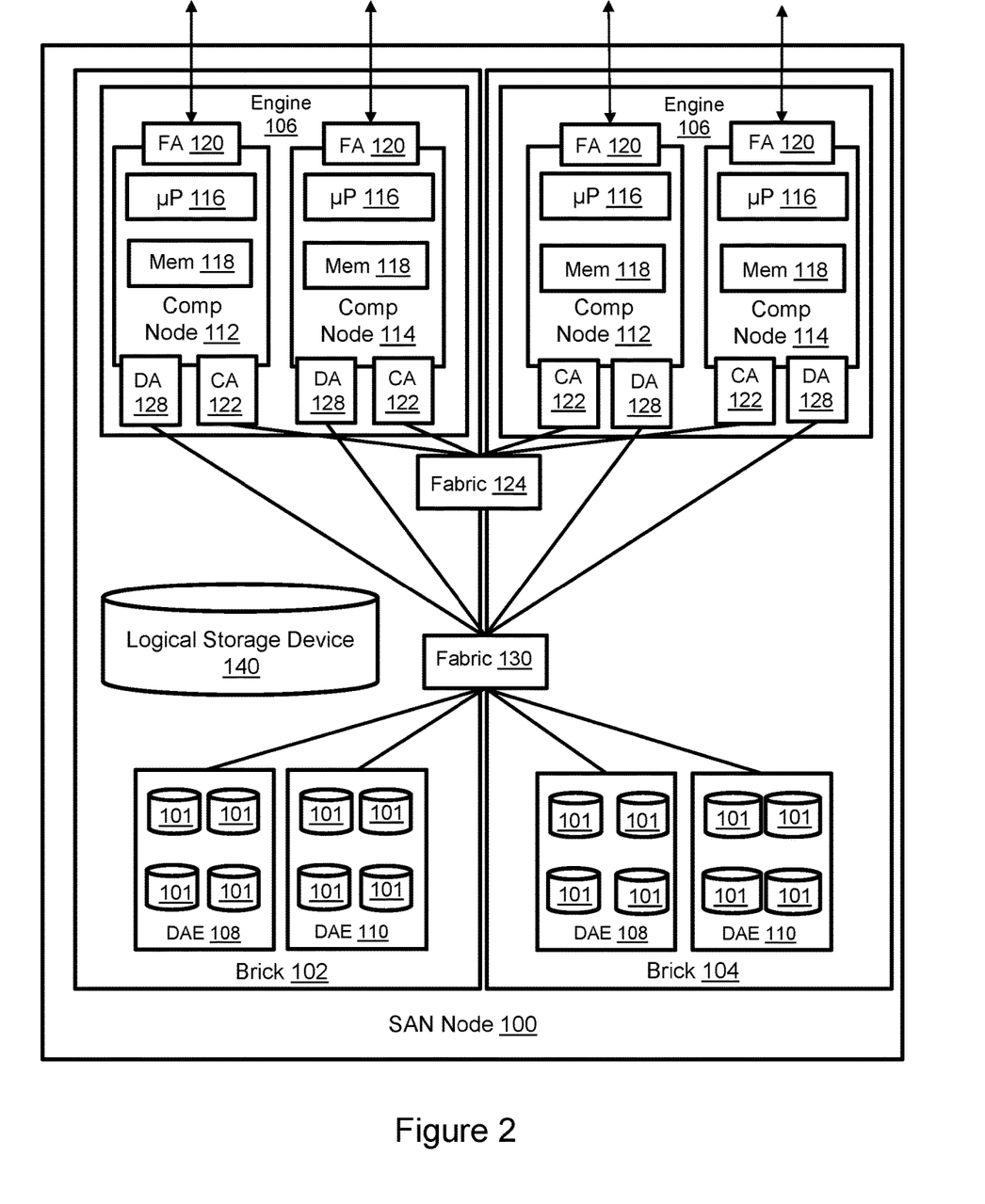
FIG. 2 illustrates a SAN node in greater detail.

FIG. 2 illustrates an example of a SAN node 100 in greater detail. The SAN node, which may be referred to as a storage array, includes one or more bricks 102, 104. Each brick includes an engine 106 and one or more drive array enclosures (DAEs) 108, 110. Each DAE includes managed drives 101 of one or more technology types. Examples may include, without limitation, solid state drives (SSDs) such as flash and hard disk drives (HDDs) with spinning disk storage media with some known storage capacity. Each DAE might include 24 or more managed drives, but the figure is simplified for purposes of illustration. Each engine 106 includes a pair of interconnected computing nodes 112, 114, which are sometimes referred to as "storage directors." Each computing node includes at least one multi-core processor 116 and local memory 118. The processor may include CPUs, GPUs, or both, and the number of cores is known. The local memory 125 may include volatile random-access memory (RAM) of any type, non-volatile memory (NVM) such as storage class memory (SCM), or both, and the capacity of each type is known. Each computing node includes one or more front-end adapters (FAs) 120 for communicating with the hosts. The FAs have ports and the hosts may access the SAN node via multiple ports in a typical implementation. Each computing node also includes one or more drive adapters (DAs) 122 for communicating with the managed drives 101 in the DAEs 108, 110. Each computing node may also include one or more channel adapters (CAs) 122 for communicating with other computing nodes via an interconnecting fabric 124. Each computing node may allocate a portion or partition of its respective local memory 118 to a logical shared "global" memory that can be accessed by other computing nodes, e.g. via direct memory access (DMA) or remote direct memory access (RDMA). The paired computing nodes 112, 114 of each engine 106 provide failover protection and may be directly interconnected by communication links. An interconnecting fabric 130 enables implementation of an N-way active-active backend. A backend connection group includes all DAs that can access the same drive or drives. In some implementations every DA 128 in the storage array can reach every DAE via the fabric 130. Further, in some implementations every DA in the SAN node can access every managed drive 101 in the SAN node.

The modeling node may be implemented as a customized SAN node. Alternatively, the modeling node may be implemented as software running on a server, virtual machine, or other hardware platform that includes processors, memory and storage resources.

Figure 3:
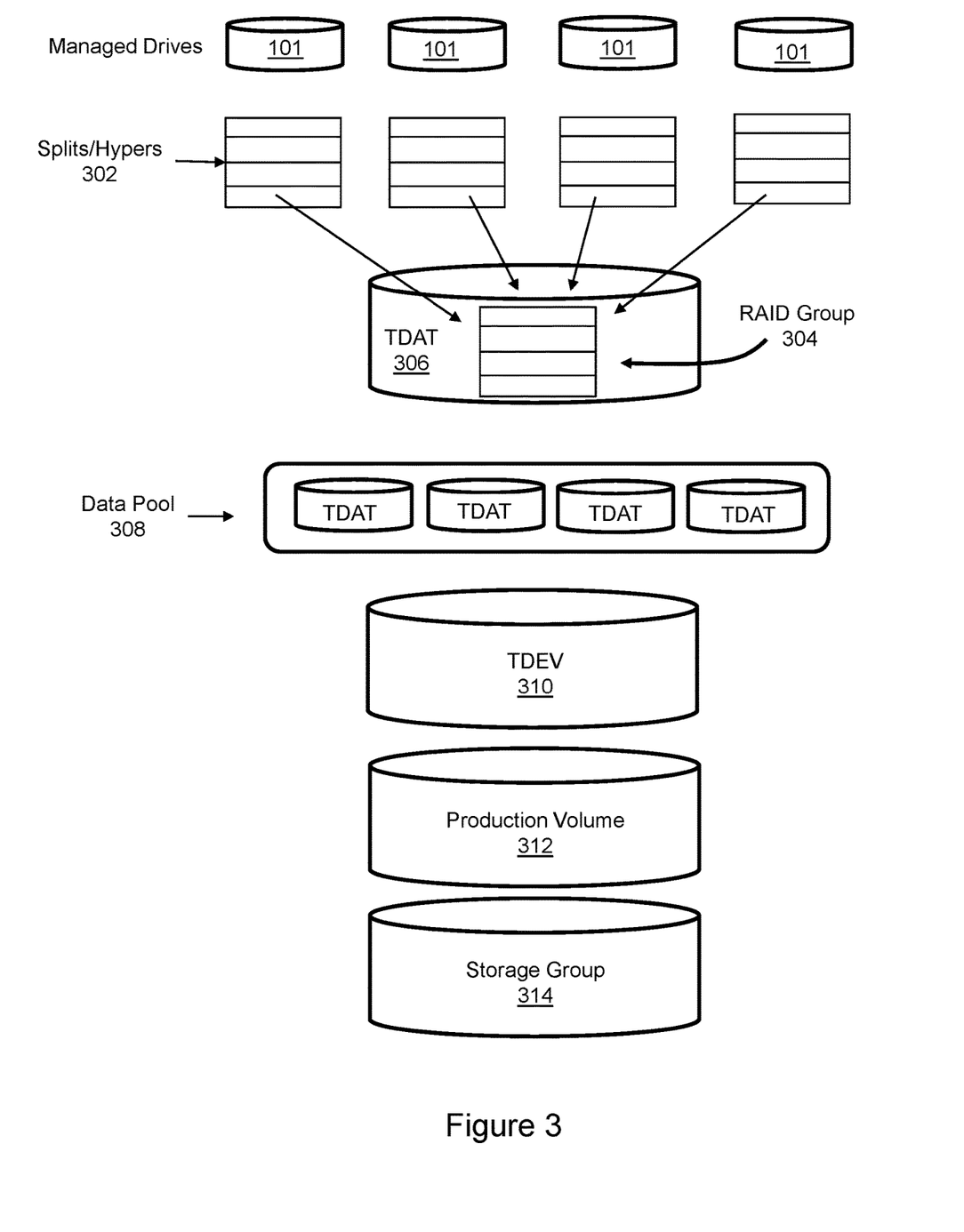
FIG. 3 illustrates layers of storage abstraction in a SAN node.

Referring to FIGS. 2 and 3, the managed drives 101 are not discoverable by the hosts but the SAN node 100 creates a logical storage device 140 that can be discovered and accessed by the hosts. The logical storage device is used by host applications for storage of host application data. Without limitation, the logical storage device may be referred to as a production volume, production device, or production LUN, where LUN (Logical Unit Number) is a number used to identify the logical storage volume in accordance with the SCSI (Small Computer System Interface) protocol. From the perspective of the hosts the logical storage device 140 is a single drive having a set of contiguous fixed-size logical block addresses (LBAs) on which data used by instances of the host application resides. However, the host application data is stored at non-contiguous addresses on various managed drives 101.

Multiple layers of abstraction are created between the managed drives 101 and the logical storage device 140. Each managed drive 101 is organized into a plurality of splits (aka hypers) 302. Each hyper is a contiguously addressed portion of the managed drive. The hypers may all have the same fixed size. RAID groups are created with member hypers from different managed drives, e.g. hypers from four different managed drives in a RAID-5 (3+1) group 304. RAID groups formed in that way may be used to create a data device (TDAT) 306. Multiple TDATs provide physical storage to be used by thin devices (TDEVs) such as TDEV 310. In some implementations, all TDATs in a drive group are of a single RAID protection type and all are the same size. Because of this, each drive in the group has the same number of hypers, with each hyper being the same size. A data pool 308, also known as a thin pool, is a collection of TDATs of the same emulation and RAID protection type. TDEVs are created with TDATs. A production volume 312 such as the logical storage device 140 is created from TDEVs. A storage group 314 may include one or more production volumes 312.

To service IOs from instances of a host application the SAN node 100 maintains metadata that indicates, among various things, mappings between LBAs of the logical storage device 140 and addresses with which extents of host application data can be accessed from the shared memory and managed drives 101. In response to a data access instruction from an instance of the host application to read data from the production volume 140 the SAN node uses the metadata to find the requested data in the shared memory or managed drives. When the requested data is already present in memory it is considered a "cache hit." If the requested data is not in the shared memory, a situation which is known as a "cache miss," then the requested data is temporarily copied into the shared memory from the managed drives and used to service the IO, i.e. reply to the host application with the data via one of the computing nodes. In the case of an IO to write data to the production volume the SAN node copies the data into shared memory, marks the corresponding logical storage device location as dirty in the metadata, and creates new metadata that maps the logical storage device address with a location to which the data is eventually written on the managed drives. Read and write "hits" and "misses" occur depending on whether the stale data associated with the IO is present in the shared memory when the IO is received.

Figure 4:
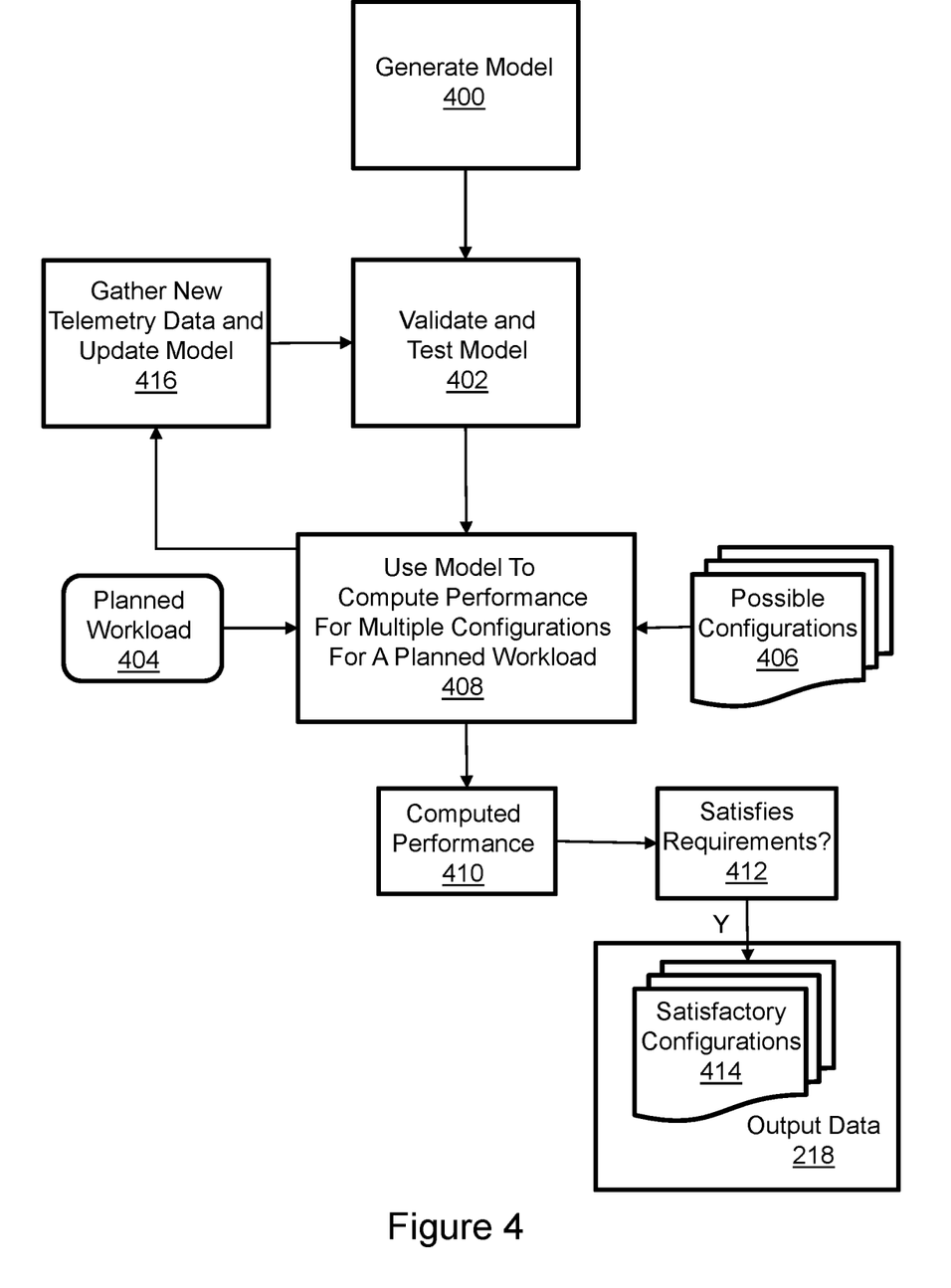
FIG. 4 illustrates computation of satisfactory configurations for the planned SAN node by the modeling node.

FIG. 4 illustrates computation of satisfactory configurations for the planned SAN node by the modeling node. The modeling node initially generates the model from gathered telemetry data from active deployed SANs as indicated in step 400. The model may be generated in accordance with a wide variety of machine learning techniques. The model is then validated and tested as indicated in step 402. A planned workload 404 and multiple possible configurations 406 are inputted to the model. Planned workload 404 may include one or more of total number of IOS received, number of reads, number of writes, number of read hits, and number of read misses, number of write hits, number of write misses, average size of reads, and average size of writes. Possible configurations 406 may include one or more of number of cores, number of engines, number of ports, number of storage groups, number of data pools, and number and capacity of drives of each type. As indicated in step 408, the model uses the planned workload and possible configurations to determine a computed (expected) performance 410 for each possible configuration under the planned workload. Computed performance 410 may include one or more of IOS completed and maximum and average IO response times, which may be separately indicated for reads and writes. Each computed performance is compared with performance requirements as indicated in step 412, e.g. as indicated in an SLA. The possible configurations that satisfy the performance requirements are outputted as satisfactory configurations 414, which may be part of the outputted data 218. A satisfactory configuration may be selected for the planned SAN node based on a variety of factors such as cost to implement and margin of safety between computed performance and the performance requirements. The model may be updated based on new telemetry data as indicated in step 416.

Figure 5:
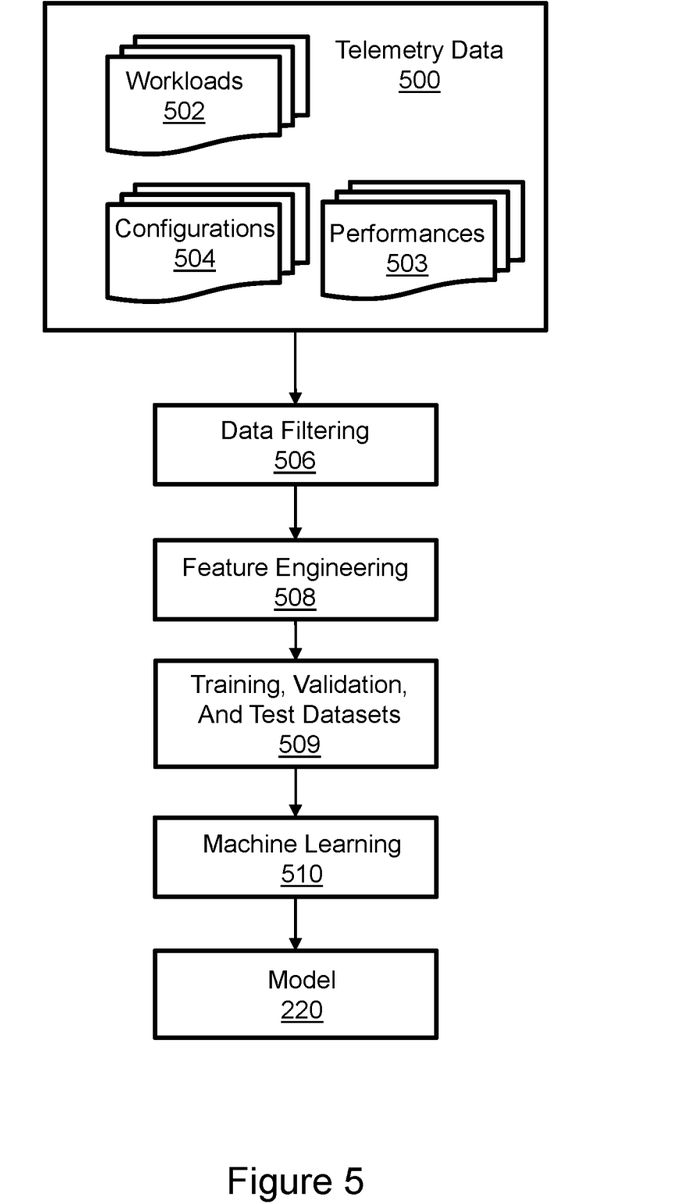
FIG. 5 illustrates model generation in greater detail.

FIG. 5 illustrates model generation in greater detail. Collected raw telemetry data 500 includes raw workload data 502, raw performance data 503, and raw configuration data 504 gathered from multiple active deployed SANs. The raw telemetry data is filtered as indicated in step 506. For example, types of raw data that are not particularly useful or relevant for model generation may be removed from consideration. Data associated with older SANs, for example, may be considered to lack relevance for a newer target SAN. Filtering may also or alternatively include removal of outlier values of types of raw data that are otherwise useful and relevant for model generation. Feature engineering is performed in step 508. Feature engineering includes generation of data types that are useful and relevant for model generation but absent from the raw telemetry data. Engineered features may include linear and nonlinear combinations of raw available attributes that are more useful and relevant than some of the individual raw component attributes. Engineered configuration features may include one or more of number of IOS per engine, number of reads per engine, number of writes per engine, number of cores per board, number of hits per engine, and number of misses per engine. Engineered workload features may include percentual of reads, percentual of writes, percentual of hits, and percentual of misses. The filtered and engineered telemetry data may be organized into non-overlapping training, validation and test datasets as indicated in step 509.

Machine learning is performed in step 510 to generate the model 220. The training dataset is used to train the model, while the validation and test datasets are used for validation and testing. One example of machine learning in step 510 is generation of a regression random forest. A supervised regression random forest model has many different decision trees whose results are compiled (e.g. using the mean value of all trees) into one final prediction value. Applying many decision trees increases variability and decreases the probability of overfitting the training data, i.e., applying a single decision tree that is too fine-tuned to the training set and performs poorly in the test set. Each decision tree runs the input through a series of questions regarding feature values until it ends up in a leaf of the decision tree. The leaf contains the predicted output value for the given input. Given an input X having three attributes (or features) A, B and C, the input traverses a series of inequality tests regarding its attribute-values to predict the numerical value associated to X. Each test directs the input towards a subset of leaves until it reaches a single leaf. The predicted value is then the mean of the values found in the leaf. The completed model 220 predicts performance, e.g. in terms of response time, for an inputted configuration and workload. More specifically, the model predicts performance for configuration and workload combinations that differ from those of the SAN nodes from which the telemetry data was gathered.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
   gathering telemetry data from a plurality of active deployed storage array network (SAN) nodes, wherein the telemetry data comprises:
   workload data comprising at least one of input-output operations per second, number of reads, number of writes, average size of reads, and average size of writes processed by ones of the plurality of active deployed SAN nodes;
   performance data comprising at least one of average response time, number of read hits, number of read misses, number of write hits, and number of write misses occurring in response to workloads processed by ones of the plurality of active deployed SAN nodes; and
   configuration data comprising amounts and types of storage and computing resources used by ones of the plurality of active deployed SANs to process the workloads;
   generating a machine learning model of relationships between SAN node workloads, performances, and configurations from the telemetry data; and
   using the machine learning model to compute at least one satisfactory configuration of amounts and types of storage and computing resources for a planned SAN node to service a planned workload that differs from all other workloads and from all other corresponding performance levels at a performance level represented by the workload data and the performance data.

2. The method of claim 1 comprising filtering irrelevant telemetry data before generating the machine learning model from the telemetry data.

3. The method of claim 1 comprising filter telemetry data outlier values before generating the machine learning model from the telemetry data.

4. The method of claim 1 comprising generating at least one engineered data type that is absent from the telemetry data, the engineered data type being included in a training dataset for generating the machine learning model from the telemetry data.

5. The method of claim 1 wherein using the machine learning model to compute at least one satisfactory configuration for the planned SAN node comprises computing performance for each of a plurality of possible configurations for the planned workload.

6. The method of claim 1 wherein using the machine learning model to compute at least one satisfactory configuration for the planned SAN node comprises computing response time for each of a plurality of possible configurations for the planned workload.

7. The method of claim 5 comprising determining whether the computed performance satisfies performance requirements.

8. The method of claim 7 comprising outputting configurations that satisfy the performance requirements.

9. The method of claim 8 comprising selecting one of the outputted configurations for the planned SAN node.

10. The method of claim 1 comprising generating a training dataset, a validation dataset, and a test dataset from the telemetry data.

11. An apparatus comprising:
    a modeling node comprising software stored in non-transitory memory and run by a processor, the software comprising:
    instructions that gather telemetry data from a plurality of active deployed storage array network (SAN) nodes, wherein the telemetry data comprises:
    workload data comprising at least one of input-output operations per second, number of reads, number of writes, average size of reads, and average size of writes processed by ones of the plurality of active deployed SAN nodes;
    performance data comprising at least one of average response time, number of read hits, number of read misses, number of write hits, and number of write misses occurring in response to workloads processed by ones of the plurality of active deployed SAN nodes; and
    configuration data comprising amounts and types of storage and computing resources used by ones of the plurality of active deployed SANs to process the workloads;
    instructions that generate a machine learning model of relationships between SAN node workloads, performances, and configurations from the telemetry data; and
    instructions that use the machine learning model to compute at least one satisfactory configuration of amounts and types of storage and computing resources for a planned SAN node to service a planned workload that differs from all other workloads and from all other corresponding performance levels at a performance level represented by the workload data and the performance data.

12. The apparatus of claim 11 comprising filtering instructions that remove from consideration irrelevant telemetry data before generating the machine learning model from the telemetry data.

13. The apparatus of claim 11 comprising filtering instructions that remove from consideration telemetry data outlier values before generating the machine learning model from the telemetry data.

14. The apparatus of claim 11 comprising feature engineering instructions that generate at least one engineered data type that is absent from the telemetry data, the engineered data type being included in a training dataset for generating the machine learning model from the telemetry data.

15. The apparatus of claim 11 wherein the instructions that use the machine learning model to compute at least one satisfactory configuration for the planned SAN node comprise instructions that compute performance for each of a plurality of possible configurations for the planned workload.

16. The apparatus of claim 11 wherein the instructions that use the machine learning model to compute at least one satisfactory configuration for the planned SAN node comprise instructions that compute response time for each of a plurality of possible configurations for the planned workload.

17. The apparatus of claim 15 comprising instructions that determine whether the computed performance satisfies performance requirements.

18. The apparatus of claim 17 comprising instructions that output configurations that satisfy the performance requirements.

19. The apparatus of claim 18 comprising instructions that select one of the outputted configurations for the planned SAN node.

20. The apparatus of claim 11 comprising instructions that generate a training dataset, a validation dataset, and a test dataset from the telemetry data.

* * * * *